(12) United States Patent
Zhu et al.

(10) Patent No.: US 10,356,156 B2
(45) Date of Patent: Jul. 16, 2019

(54) METHOD AND DEVICE FOR LOADING WEBPAGE

(71) Applicant: Delta Electronics (Shanghai) CO., LTD, Shanghai (CN)

(72) Inventors: Ziyu Zhu, Shanghai (CN); Yong Ni, Shanghai (CN); Dong Xie, Shanghai (CN); Dongdong Su, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 59 days.

(21) Appl. No.: 15/299,740

(22) Filed: Oct. 21, 2016

(65) Prior Publication Data

US 2017/0272499 A1    Sep. 21, 2017

(30) Foreign Application Priority Data

Mar. 17, 2016   (CN) .......................... 2016 1 0153005

(51) Int. Cl.
*H04L 29/06* (2006.01)
*H04L 29/08* (2006.01)

(52) U.S. Cl.
CPC .............. *H04L 67/02* (2013.01); *H04L 67/42* (2013.01); *H04L 69/22* (2013.01)

(58) Field of Classification Search
CPC ............. G06F 17/3089; G06F 17/2247; G06F 17/30873; G06F 21/6263; G06F 17/30893; G06F 21/62; G06F 21/6245; G06Q 30/02; H04L 63/101; H04L 63/102; H04L 63/168; H04L 67/22; H04L 63/1466; H04L 63/0428
See application file for complete search history.

(56) References Cited

U.S. PATENT DOCUMENTS

| | | | |
|---|---|---|---|
| 9,613,011 B2 * | 4/2017 | Lund | H04W 4/21 |
| 9,639,623 B2 * | 5/2017 | Lund | H04L 67/10 |
| 2010/0082410 A1 * | 4/2010 | Baudin | G06Q 30/0201 |
| | | | 705/7.29 |

(Continued)

FOREIGN PATENT DOCUMENTS

| CN | 1870508 A | 11/2006 |
|---|---|---|
| CN | 101226525 A | 7/2008 |

(Continued)

OTHER PUBLICATIONS

The CN1OA issued May 7, 2019 by the CNIPA.

*Primary Examiner* — Ninos Donabed
(74) *Attorney, Agent, or Firm* — Yunling Ren

(57) ABSTRACT

The present disclosure discloses a method and a device for loading a webpage. The method for loading a webpage includes: sending a webpage request message to a server; receiving an initial webpage of the webpage returned from the server, the initial webpage including an agent; sending a WebSocket connection request message to the server through the agent, to establish a WebSocket connection with the server; sending a page component request message of the webpage to the server based on the WebSocket connection, to load page component of the webpage; receiving the page components of the webpage returned from the server based on the WebSocket connection; and creating the page components at corresponding positions in the initial webpage.

17 Claims, 17 Drawing Sheets

(56) References Cited

U.S. PATENT DOCUMENTS

| | | | |
|---|---|---|---|
| 2010/0281107 A1* | 11/2010 | Fallows | G06F 9/54 709/203 |
| 2013/0290516 A1* | 10/2013 | Eaton | G06F 16/958 709/224 |
| 2014/0006475 A1* | 1/2014 | Harpster | G06F 17/30861 709/202 |
| 2014/0109041 A1* | 4/2014 | Yunten | G06F 8/34 717/109 |
| 2014/0181631 A1* | 6/2014 | Lund | H04L 67/10 715/234 |
| 2014/0181639 A1* | 6/2014 | Lund | H04W 4/21 715/234 |
| 2014/0181947 A1* | 6/2014 | Lund | H04L 63/08 726/9 |
| 2014/0201838 A1* | 7/2014 | Varsanyi | G06F 21/552 726/23 |
| 2014/0280691 A1* | 9/2014 | Buerner | H04L 67/02 709/217 |
| 2014/0310599 A1* | 10/2014 | Clift | H04N 21/4126 715/719 |
| 2015/0067138 A1* | 3/2015 | Gianfelici | G06F 17/3089 709/224 |
| 2015/0281355 A1* | 10/2015 | Maturana | H04L 67/1097 709/202 |
| 2016/0028688 A1* | 1/2016 | Chizhov | H04L 63/029 726/12 |
| 2016/0037215 A1* | 2/2016 | Cardona | H04N 21/8456 725/31 |
| 2016/0099994 A1* | 4/2016 | Kawazoe | H04W 80/06 709/226 |
| 2016/0173617 A1* | 6/2016 | Allinson | H04L 67/02 709/227 |
| 2016/0196246 A1* | 7/2016 | Karpov | G06F 17/30893 715/229 |
| 2017/0149915 A1* | 5/2017 | Jolfaei | H04L 67/26 |
| 2018/0041567 A1* | 2/2018 | Kidambi | H04L 67/06 |

FOREIGN PATENT DOCUMENTS

| | | |
|---|---|---|
| CN | 101697139 A | 4/2010 |
| CN | 102214200 A | 10/2011 |
| CN | 104820539 A | 8/2015 |

* cited by examiner

24

METHOD AND DEVICE FOR LOADING WEBPAGE

CROSS REFERENCE

This application is based upon and claims priority to Chinese Patent Application No. 201610153005.7, filed on Mar. 17, 2016, the entire contents thereof are incorporated herein by reference.

TECHNICAL FIELD

The present disclosure relates to the field of computer network, and more particularly, to a method and device for loading a webpage.

BACKGROUND

Generally, in current Web-based interactive applications, when a client initiates a page request to the server, the server returns a page (HTML file) requested by the client back to the client to complete a webpage loading process. However, such an interaction involves the following disadvantages.

Firstly, page updating is performed based on polling. The client periodically sends an HTTP request to the server, and the server returns updated data for the entire page to the client. According to such a conventional page updating based on the HTTP request, the client is required to keep sending requests to the server. However, an HTTP request header is very long, which will occupy a lot of bandwidth and waste a lot of resources. Although an asynchronous JavaScript and XML (AJAX) technology may perform partial page update by sending an AJAX request from the client to the server, the AJAX request is also performed based on polling. That is, regardless of whether the actual page data is updated, AJAX requests are sent to the server periodically, thereby wasting bandwidth resources.

Secondly, in a case of high concurrent user access, it is unable to provide user data flow control based on a granularity of page component.

Thirdly, it is unable to personalize webpage loading. With respect to the same requested page, a layout and content displayed in the client are the same for all users. Even for a particular user with special authorizations, an overall page layout and content are unable to be dynamically created or controlled by a backend server.

SUMMARY

Accordingly, the present disclosure provides a method and a device for loading a webpage.

Other features and advantages of the present disclosure will become apparent by the following detailed description, or in part, may be learned by implementation of the present disclosure.

According to an aspect of the present disclosure, there is provided a method for loading a webpage including: sending a webpage request message to a Web server; receiving an initial webpage of the webpage returned from the Web server, the initial webpage including an agent; sending a WebSocket connection request message to the Web server through the agent, to establish a WebSocket connection with the Web server; sending a page component request message of the webpage to the Web server based on the WebSocket connection, to load page components of the webpage; receiving the page component of the webpage returned from the Web server based on the WebSocket connection; and creating the page components at corresponding positions in the initial webpage.

According to another aspect of the present disclosure, there is provide a method for loading a webpage including: receiving a webpage request message sent from a client; sending an initial webpage of the webpage to the client, the initial webpage including an agent; receiving a WebSocket connection request message sent from the client, to establish a WebSocket connection with the client; receiving a page component request message of the webpage sent from the client based on the WebSocket connection; obtaining a page component of the webpage of the client; and sending the page components of the webpage to the client based on the WebSocket connection.

According to yet another aspect of the present disclosure, there is provided a device for loading a webpage applicable in a client, the device including: a device interface module, configured to: send a webpage request message to a Web server; receive an initial webpage of the webpage returned from the Web server, the initial webpage including an agent; and send a WebSocket connection request message to the Web server through the agent, to establish a WebSocket connection with the Web server; a connection interface module, configured to: send a page component request message of the webpage to the Web server based on the WebSocket connection, to load page components of the webpage; and receive the page component of the webpage returned from the Web server based on the WebSocket connection; and a component creating module configured to create the page components at corresponding positions in the initial webpage.

According to a further aspect of the present disclosure, there is provided a device for loading a webpage applicable in a Web server, the device including: a device interface module, configured to: receive a webpage request message sent from a client; send an initial webpage of the webpage to the client, the initial webpage including an agent; and receive a WebSocket connection request message sent from the client, to establish a WebSocket connection with the client; a connection interface module, configured to receive a page component request message of the webpage sent from the client based on the WebSocket connection; and a component management module configured to obtain page components of the webpage of the client, wherein the connection interface module is further configured to send the page components of the webpage to the client based on the WebSocket connection.

It is to be understood that both the foregoing general description and the following detailed description are exemplary only and are not restrictive of the present disclosure.

This section provides a summary of various implementations or examples of the technology described in the disclosure, and is not a comprehensive disclosure of the full scope or all features of the disclosed technology.

BRIEF DESCRIPTION OF THE DRAWINGS

The above and other objectives, features and advantages of the present disclosure will become more apparent by describing exemplary embodiments of the present disclosure in detail by referring to the accompanying drawings.

DETAILED DESCRIPTION

Figure 1:
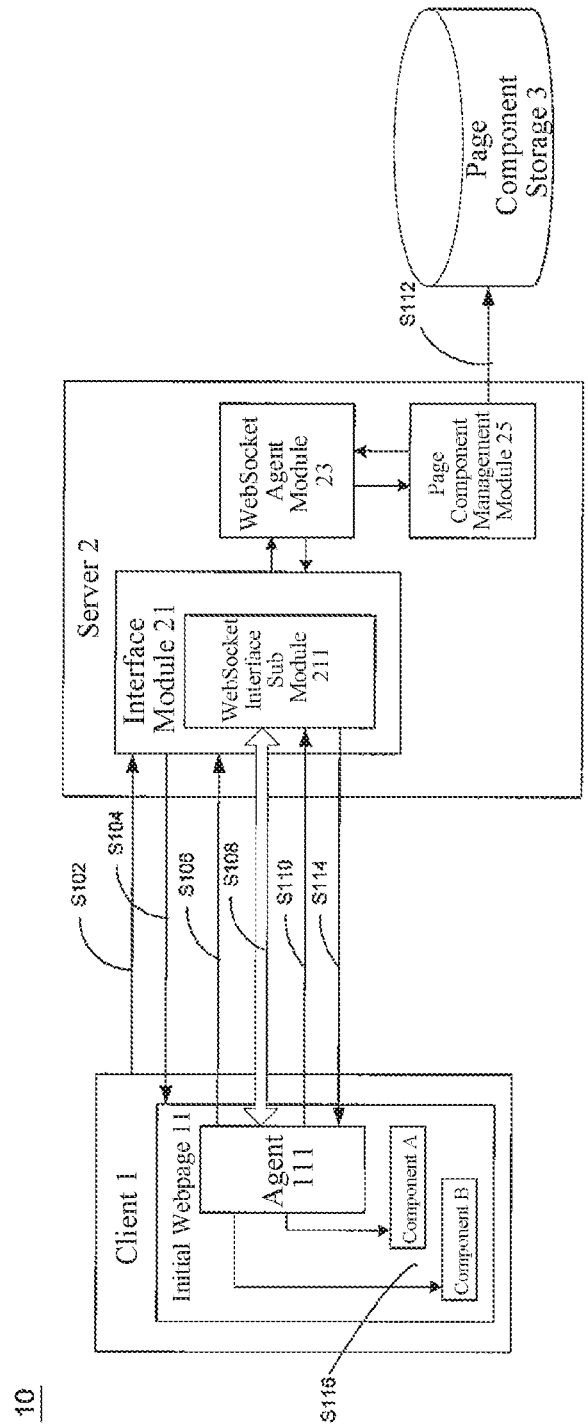
FIG. 1 is a schematic view illustrating a message interaction of a method for loading a webpage according to an exemplary embodiment.

The exemplary implementations will now be described more fully with reference to the accompanying drawings. However, the exemplary implementations may be implemented in various forms and should not be understood as being limited to the implementations set forth herein; rather, these implementations are provided so that this disclosure will be thorough and complete, and will fully convey the conception of exemplary implementations to those skilled in the art. The accompanying drawings are only schematic illustration of the present disclosure, and may be not drawn to scale. In the drawings, the same reference numerals denote the same or similar structures, thus their detailed description will be omitted.

In addition, the features, structures or characteristics described herein can be combined in one or more embodiments in any appropriate way. In the description hereinafter, many specific details are provided for fully understanding of the embodiments of the present disclosure. However, it will be appreciated by those skilled in the art that the technical solution of the present disclosure can be practiced without one or more of the specific details, or with other methods, components, devices or steps, etc. In addition, known structures, methods, devices, implementations, materials or operations will not be illustrated or described in detail, to avoid obscuration of the aspects of the present disclosure.

FIG. 1 is a schematic view illustrating a message interaction of a method for loading a webpage according to an exemplary embodiment. As illustrated in FIG. 1, the method 10 for loading a webpage including the steps as follows.

In step S102, a client 1 sends a webpage request message to a server 2, e.g. a Web server 2.

The client 1, for example, may be a web browser. When a user inputs a corresponding web address in an address bar of the web browser, the web browser sends a webpage request message to the corresponding web server 2 according to the inputted web address.

In step S104, the server 2, in response to the webpage request, sends an initial webpage 11 to the client 1 in response to the webpage request. The initial webpage 11 may include an agent 111.

The agent 111, for example, may be implemented as a front-end script.

In step S106, after receiving the initial webpage, the client 1 sends a WebSocket connection request message to the server 2 through the agent, to request establishing a WebSocket connection between the client 1 and the server 2.

For example, as illustrated in the drawings, the client 1 creates the initial webpage 11 including the agent 111, and sends the WebSocket connection request message to the server 2 through the agent 111, to request establishing the WebSocket connection between the client 1 and the server 2.

In step S108, a process for establishing a WebSocket connection between the client 1 and the server 2 is performed.

The process for establishing a WebSocket connection is well-known to those skilled in the art, and thus detailed description of the particular processes will be omitted herein.

In step S110, after completing establishing the WebSocket connection, the client 1 sends a page component request message to the server 2 through the agent on the WebSocket connection, to request loading page components (or a page component).

In step S112, after receiving the page component request message, the server 2 obtains the page components of the client 1 from a page component storage 3.

In one embodiment, for example, page component IDs are used as the index of page components.

In a practical application, according to actual requirements, the page component storage 3 may be implemented in one physical entity with the server 2, or may be implemented in different physical entities. The present disclosure is not limited thereto.

In some embodiments, the server 2 may include an interface module 21, a WebSocket agent module 23 and a page component management module 25. In one embodiment, the interface module 21 may further include a WebSocket interface sub module 211. After the WebSocket interface sub module 211 receives a page component request message on the WebSocket connection, the WebSocket agent module 23 maps the WebSocket connection with the requested webpage and determines a webpage corresponding to the page component request. After determining the webpage, corresponding page components are obtained from the page component storage 3 by the page component management module 25 and transferred to the WebSocket agent module 23.

In step S114, the obtained page components and a layout thereof are pushed to the client 1 through the WebSocket connection.

For example, the page component management module 25 pushes the page components and the layout thereof to the client through the WebSocket interface sub module 211.

When it is required to push a plurality of page components to the client 1, the server 2 may push the page components to the client 1 by a plurality of messages. For example, each message may carry a different page component (e.g., page components A and B illustrated in FIG. 1), respectively. Alternatively, one message may carry a part of the page components. The server 2 may also package all the page components in one message and send the package to the client 1 at one time.

In step S116, after receiving the page components sent from the server 2 through the established WebSocket connection, the client 1 creates corresponding page components at corresponding positions in the initial webpage according to the received page components and the layout thereof.

The method 10 for loading a webpage according to the present disclosure differs from the method for loading a webpage in the related art in that: according to the present disclosure, the server 2 firstly returns an agent through an initial webpage to the client 1 according to a request of the client 1. Afterwards, a WebSocket connection is established between the client 1 and the server 2 using an agent. Based on the WebSocket connection, the client 1 may send a request for loading page components to the server 2 and the server 2 may return corresponding page components and a layout thereof to the client 1 according to the request for loading page components, such that the client 1 may create corresponding page components in the initial webpage according to the page components and the layout thereof.

It should be appreciated that forming and utilizing of particular examples have been described in the present disclosure, however, the principles of the present disclosure is not limited to any details of the examples. Rather, these principles may be applied to various other embodiments based on teaching of contents disclosed by the present disclosure.

Figure 2:
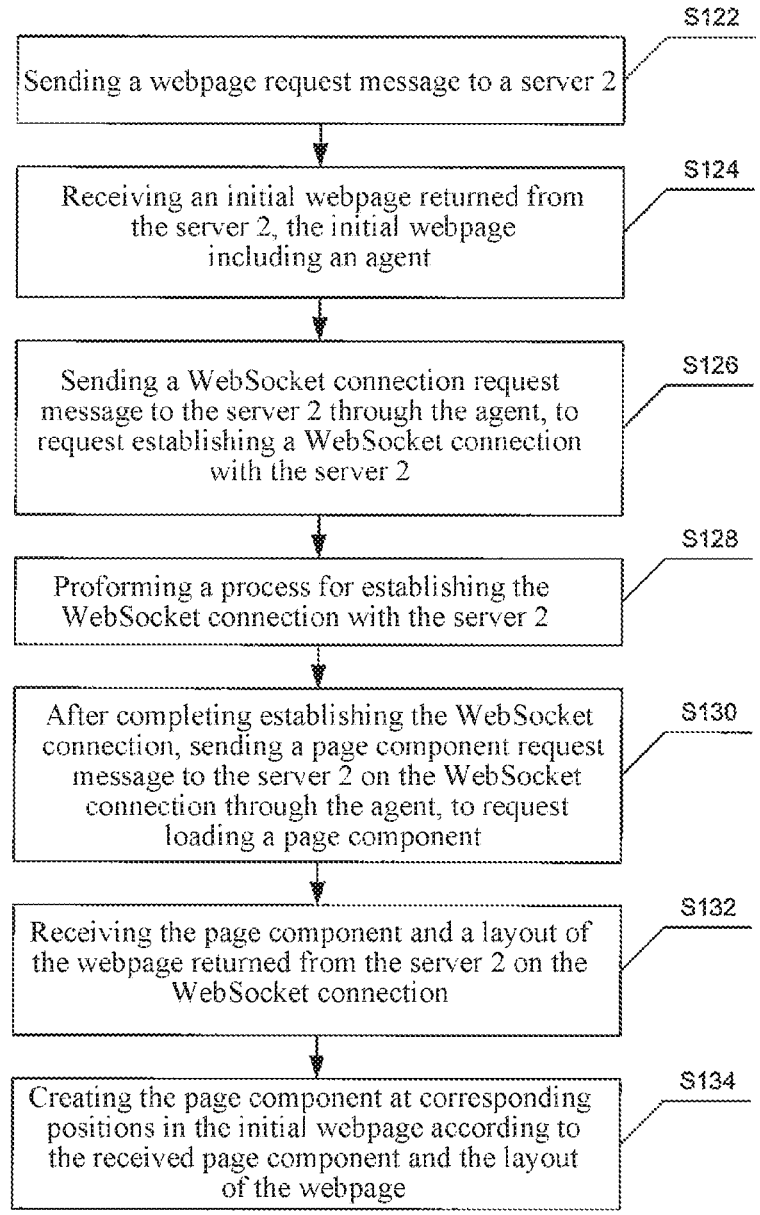
FIG. 2 is a flow chart illustrating another method for loading a webpage according to an exemplary embodiment.

FIG. 2 is a flow chart illustrating another method for loading a webpage according to an exemplary embodiment. The method 12 for loading a webpage illustrated in FIG. 2 is applicable in a web client. As illustrated in FIG. 2, the method 12 for loading a webpage includes the steps as follows.

In step S122, a webpage request message is sent to the server 2.

For example, the webpage request message may be an HTTP request message based on HTTP protocols.

In step S124, an initial webpage returned from the server 2 is received, the initial webpage including an agent.

The initial webpage is returned to the client 1 from the server 2 in response to the webpage request message. For example, the agent may be implemented as a front-end script program.

In step S126, a WebSocket connection request message is sent to the server 2 through the agent, to request establishing a WebSocket connection between the client 1 and the server 2.

For example, the client 1 illustrated in the drawings creates the initial webpage 11, the initial webpage 11 includes the agent 111, and the client 1 sends the WebSocket connection request message to the server 2 through the agent 111, to request establishing the WebSocket connection between the client 1 and the server 2.

In step S128, a process for establishing WebSocket connection with the server 2 is performed.

The process for establishing a WebSocket connection is well-known to those skilled in the art, and thus detailed description of the particular processes will be omitted herein.

In step S130, after completing establishing the WebSocket connection, a page component request message is sent to the server 2 through the agent on the WebSocket connection, to request loading page components.

In step S132, page components and a layout thereof returned from the server 2 on the WebSocket connection are received.

When it is required to push a plurality of page components to the client 1, the server 2 may push the page components to the client 1 by a plurality of messages. For example, each message may carry a different page component (e.g., page components A and B illustrated in FIG. 1), respectively. Alternatively, one message may carry a part of the page components. The server 2 may also package all the page components in one message and send the package to the client 1 at one time.

In step S134, corresponding page components are created at corresponding positions in the initial webpage according to the received page components and the layout thereof.

Figure 3:
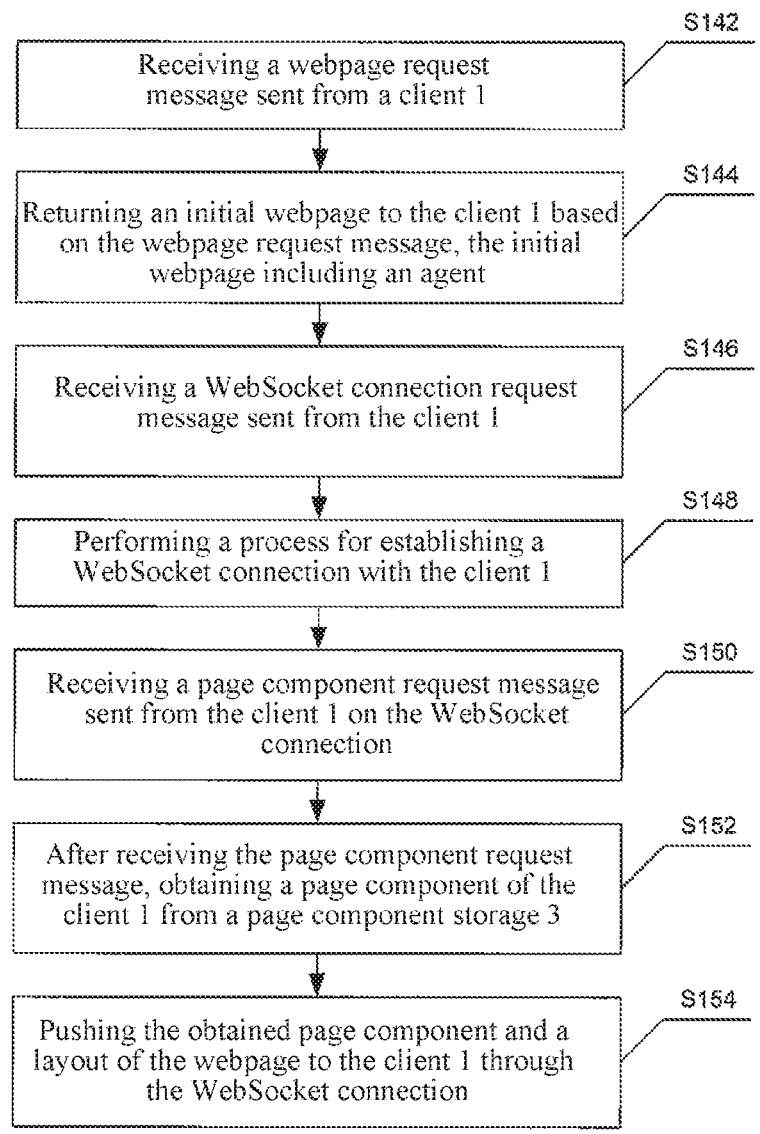
FIG. 3 is a flow chart illustrating yet another method for loading a webpage according to an exemplary embodiment.

FIG. 3 is a flow chart illustrating yet another method for loading a webpage according to an exemplary embodiment. The method 14 for loading a webpage illustrated in FIG. 3 is applicable in a web server. As illustrated in FIG. 3, the method 14 for loading a webpage includes the steps as follows.

In step S142, a webpage request message sent from a client 1 is received.

For example, the webpage request message may be an HTTP request message.

In step S144, based on the webpage request message, an initial webpage including an agent is returned to the client 1.

For example, the agent may be implemented as a front-end script program.

In step S146, a WebSocket connection request message sent from the client 1 is received.

In step S148, a process for establishing WebSocket connection with the client 1 is performed.

The process for establishing a WebSocket connection is well-known to those skilled in the art, and thus detailed description of the particular processes will be omitted herein.

In step S150, a page component request message sent from the client 1 is received on the WebSocket connection.

In step S152, after receiving the page component request message, page components for the client 1 are obtained from a page component storage 3.

In a practical application, according to actual requirements, the page component storage 3 may be implemented in one physical entity with the server 2, or may be implemented in different physical entities. The present disclosure is not limited thereto.

Referring together to FIG. 1, in some embodiments, the server 2 may include an interface module 21, a WebSocket agent module 23 and a page component management module 25. In one embodiment, the interface module 21 may further include a WebSocket interface sub module 211. After the WebSocket interface sub module 211 receives a page component request message on the WebSocket connection, the WebSocket agent module 23 maps the WebSocket connection with the requested webpage and determines a webpage corresponding to the page component request. After determining the webpage, corresponding page components are obtained from the page component storage 3 by the page component management module 25 and transferred to the WebSocket agent module 23.

In step S154, the obtained page components and a layout thereof are pushed to the client 1 through the WebSocket connection.

For example, the page component management module 25 pushes the page components and the layout thereof to the client through the WebSocket interface sub module 211.

When it is required to push a plurality of page components to the client 1, the server 2 may push the page components to the client 1 by a plurality of messages. For example, each message may carry a different page component (e.g., page components A and B illustrated in FIG. 1), respectively. Alternatively, one message may carry a part of the page components. The server 2 may also package all the page components in one message and send the package to the client 1 at one time.

Figure 4:
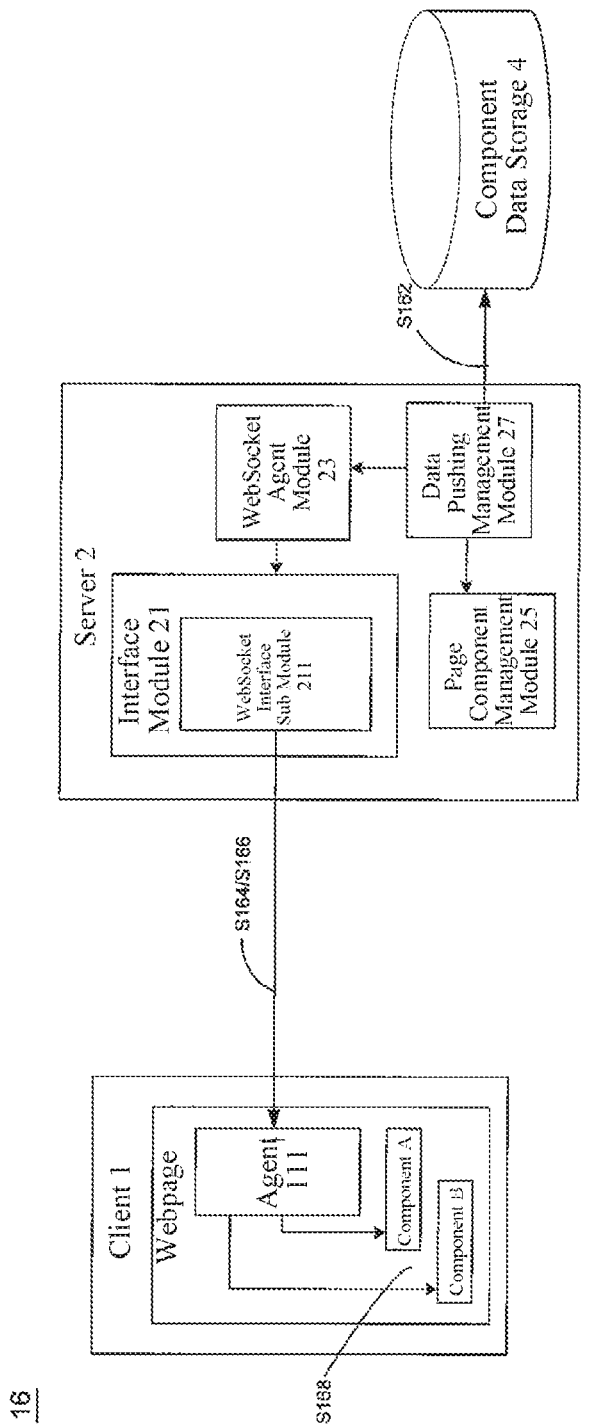
FIG. 4 is a schematic view illustrating a message interaction of yet another method for loading a webpage according to an exemplary embodiment.

FIG. 4 is a schematic view illustrating a message interaction of yet another method for loading a webpage according to an exemplary embodiment. The method 16 for loading a webpage is applicable in a process for pushing component data. As illustrated in FIG. 4, the method 16 for loading a webpage may include the steps as follows.

In step S162, the server 2 obtains component data for the client 1 from a component data storage 4.

For example, after sending all of the page components to the client 1, i.e., initially obtaining the component data, component data for all of the components are obtained from the component data storage 4. Alternatively, with respect to each page component, component data of said page component is obtained from the component data storage 4 periodically, and thus the component data of the page component is pushed to the client 1 periodically.

In a practical application, according to actual requirements, the component data storage 4 may be implemented in one physical entity with the server 2, or may be implemented in different physical entities. The present disclosure is not limited thereto. For example, the component data storage 4 may be a database, a cache, or the like.

In some embodiments, while initially sending component data to the client 1, instead of sending component data after all the page components have been sent, the component data of the page component may be obtained from the component data storage 4 immediately after sending one of the page component, such that the page component and the component data may be packaged in one message or a plurality of messages and sent simultaneously or successively.

In some embodiments, the server 2 may further include a data pushing management module 27. Before pushing the component data, the data pushing management module 27 may inquire configuration properties of each page component from the page component management module 25 using a configuration reading message. For example, the configuration properties may include whether it is configured to push data actively, addresses of data source (i.e., the component data storage 4 storing the component data) of the component data of the page component, a period of pushing component data, or the like. According to the read configuration properties of the page components, the data pushing management module 27 obtains the component data from the component data storage 4 and transfers the same to the WebSocket agent module 23.

In step S164, the server 2 pushes the obtained component data to the client 1 through the WebSocket connection.

For example, the data pushing management module 27 determines a WebSocket connection corresponding to the webpage through the WebSocket agent module 23. Afterwards, the data pushing management module 27 pushes the page components and a layout thereof to the client 1 through the WebSocket interface sub module 211.

When it is required to push a plurality of pieces of component data, the plurality of pieces of component data may be packaged and sent in one message, or may be sent respectively. The present disclosure is not limited thereto.

In step S166, the client 1 receives the component data based on the established WebSocket connection.

In step S168, the client 1 parses the received component data and updates the corresponding page component, thereby updating the display of the webpage.

The method 16 for loading a webpage according to embodiments of the present disclosure further provides a method for pushing component data. After initially loading component data of all the page components, updated page data of each page component may be pushed periodically based on configuration of each page component through the established WebSocket connection, thereby avoiding the problems of wasting bandwidth resources due to requesting updating page data by polling according to the related art.

Figure 5:
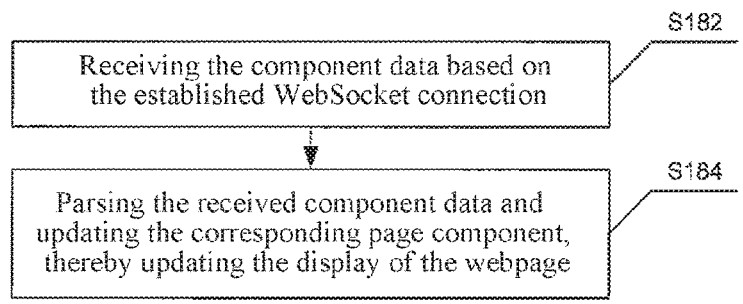
FIG. 5 is a flow chart illustrating yet another method for loading a webpage according to an exemplary embodiment.

FIG. 5 is a flow chart illustrating yet another method for loading a webpage according to an exemplary embodiment. The method 18 for loading a webpage illustrated in FIG. 5 may be applicable in a web client. As illustrated in FIG. 5, the method 18 for loading a webpage may include the steps as follows.

In step S182, component data is received based on the established WebSocket connection.

In step S184, the received component data is parsed and corresponding the page component is updated, thereby updating the display of the webpage.

Figure 6:
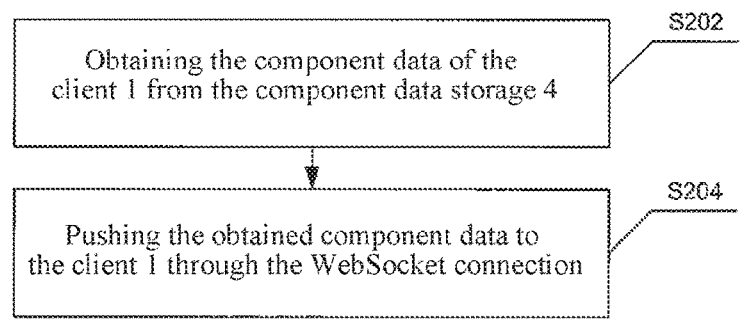
FIG. 6 is a flow chart illustrating yet another method for loading a webpage according to an exemplary embodiment.

FIG. 6 is a flow chart illustrating yet another method for loading a webpage according to an exemplary embodiment. The method 20 for loading a webpage illustrated in FIG. 6 may be applicable in a web server. As illustrated in FIG. 6 the method 20 for loading a webpage may include the steps as follows.

In step S202, component data for the client 1 is obtained from the component data storage 4.

For example, after sending all of the page components to the client 1, i.e., initially obtaining the component data, component data for all of the components are obtained from the component data storage 4. Alternatively, with respect to each page component, component data of said page component is obtained from the component data storage 4 periodically, and thus the component data of the page component is pushed to the client 1 periodically.

In a practical application, according to actual requirements, the component data storage 4 may be implemented in one physical entity with the server 2, or may be implemented in different physical entities. The present disclosure is not limited thereto. For example, the component data storage 4 may be a database, a cache, or the like.

In some embodiments, while initially sending component data to the client 1, instead of sending component data after all the page components have been sent, the component data of the page component may be obtained from the component data storage 4 immediately after sending one of the page component, such that the page component and the component data may be packaged in one message or a plurality of messages and sent simultaneously or successively.

In some embodiments, the server 2 may further include a data pushing management module 27. Before pushing the component data, the data pushing management module 27 may inquire configuration properties of each page component from the page component management module 25 using a configuration reading message. For example, the configuration properties may include whether it is configured to push data actively, addresses of data source (i.e., the component data storage 4 storing the component data) of the component data of the page component, a period of pushing component data, or the like. According to the read configuration properties of the page components, the data pushing management module 27 obtains the component data from the component data storage 4 and transfers the same to the WebSocket agent module 23.

In step S204, the obtained component data is pushed to the client 1 through the WebSocket connection.

For example, the data pushing management module 27 determines a WebSocket connection corresponding to the webpage through the WebSocket agent module 23. Afterwards, the data pushing management module 27 pushes the page components and a layout thereof to the client 1 through the WebSocket interface sub module 211.

When it is required to push a plurality of pieces of component data, the plurality of pieces of component data may be packaged and sent in one message, or may be sent respectively. The present disclosure is not limited thereto.

Figure 7:
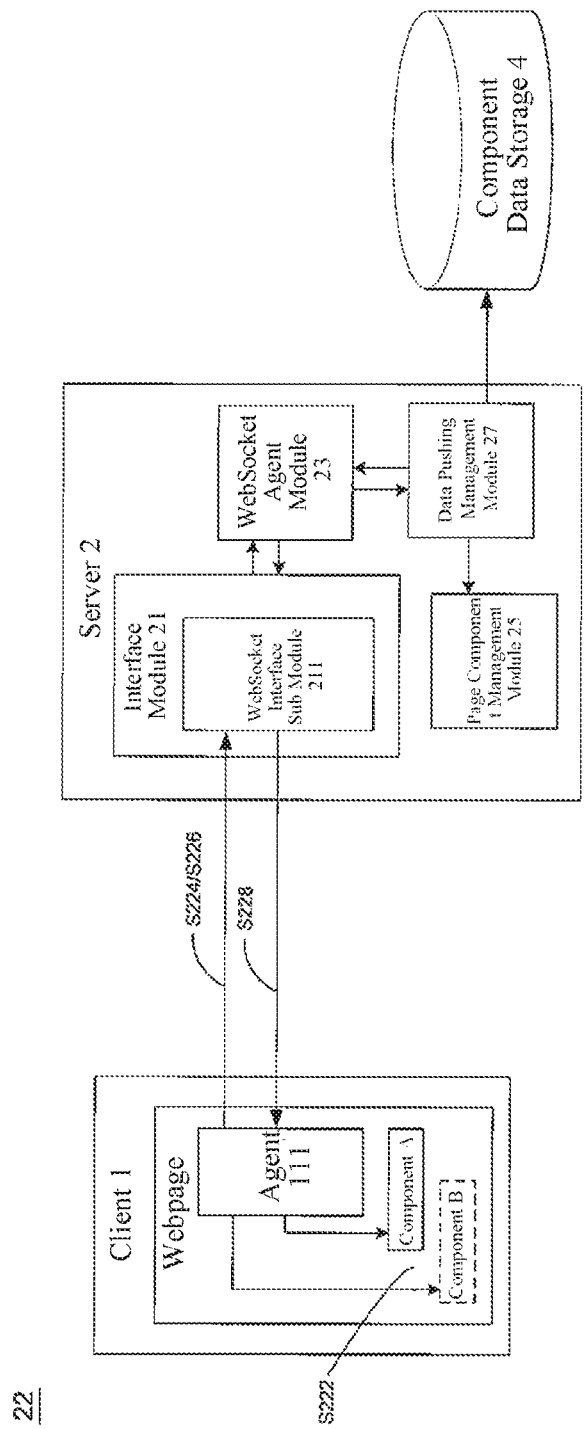
FIG. 7 is a schematic view illustrating a message interaction of yet another method for loading a webpage according to an exemplary embodiment.

FIG. 7 is a schematic view illustrating a message interaction of yet another method for loading a webpage according to an exemplary embodiment. As illustrated in FIG. 7, the method 22 for loading a webpage may include the steps as follows.

In step S222, when the user operates manually to hide or unhide one or more page components in the webpage, the client 1 may sense the change of the webpage through the agent and correspondingly generate a list of the changes of the page components.

For example, as illustrated in FIG. 7, the page component B is hidden. The user may hide or unhide one or more pages, e.g. label pages (tab pages) in the webpage by clicking.

The list of the changes of the page components may include a part or all of: each page component that is hidden at this time, each page component that is unhidden at this time, all the currently hidden page components, and all the page components that are not hidden currently.

In step S224, the client 1 sends the list of the changes of the page components to the server 2 based on the established WebSocket connection.

In step S226, the server 2 receives the list of the changes of the page components.

In step S228, when receiving the list of the changes of the page components, the server 2 stops the pushing of the component data of the hidden page components and/or restores the pushing of the component data of the unhidden page components, according to the list of the changes of the page components.

In the case where the list of the changes of the page components includes only the newly added hidden page component at this time, the pushing of the component data of the newly added hidden page component is stopped. In the case where the list of the changes of the page components includes only the unhidden page component at this time, the pushing of the component data of the unhidden page component is restored. In the case where the list of the changes of the page components includes both the newly added hidden page component and the unhidden page component at this time, the pushing of the component data of the newly added hidden page component is stopped and the pushing of the component data of the unhidden page component is restored.

In some embodiment, after the WebSocket agent module 23 sends the received list of the changes of the page components to the data pushing management module 27, the data pushing management module 27 may store the hidden page component and/or the unhidden page component, thereby stopping pushing the component data of the hidden page component and/or restoring pushing the component data of the unhidden page component. Alternatively, the data pushing management module 27 may also send the list of the changes of the page components to the page component management module 25, the page component management module 25 stores the list of the changes of the page components and determines the hidden and/or unhidden page component according to the list of the changes of the page components. While it is required to push component data of the page component, the data pushing management module 27 inquires in the page component management module 25 whether said page component to send data is hidden, if it is hidden, component data thereof will not be pushed, and if it is unhidden, the pushing of the component data will be restored.

The method 22 for loading a webpage according to embodiments of the present disclosure further provides a method for processing component data of the hidden page component. With respect to the hidden page component, the pushing of its component data is stopped; while after the hidden page component is restored, the pushing of its component data is continued.

Figure 8:
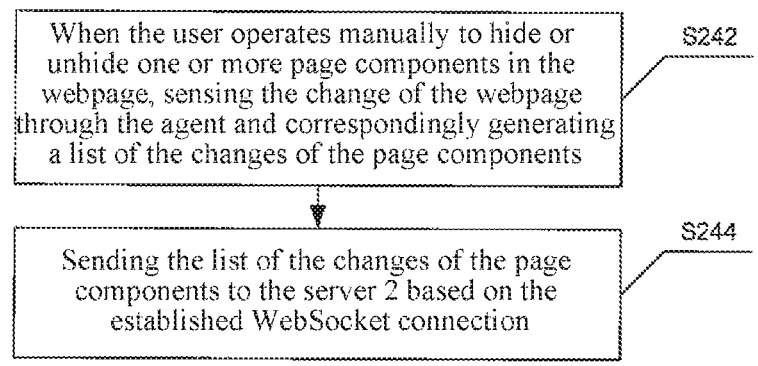
FIG. 8 is a flow chart illustrating yet another method for loading a webpage according to an exemplary embodiment.

FIG. 8 is a flow chart illustrating yet another method for loading a webpage according to an exemplary embodiment. The method 24 for loading a webpage illustrated in FIG. 8 is applicable in a web client. As illustrated in FIG. 8, the method 24 for loading a webpage includes the steps as follows.

In step S242, when the user operates manually to hide or unhide one or more page components in the webpage, the change of the webpage may be sensed through the agent and a list of the changes of the page components may be correspondingly generated.

For example, the user may hide or unhide one or more pages, e.g. label pages (tab pages) in the webpage by clicking.

The list of the changes of the page components may include a part or all of: each page component that is hidden at this time, each page component that is unhidden at this time, all the currently hidden page components, and all the page components that are not hidden currently.

In step S244, the list of the changes of the page components is sent to the server 2 based on the established WebSocket connection.

Figure 9:
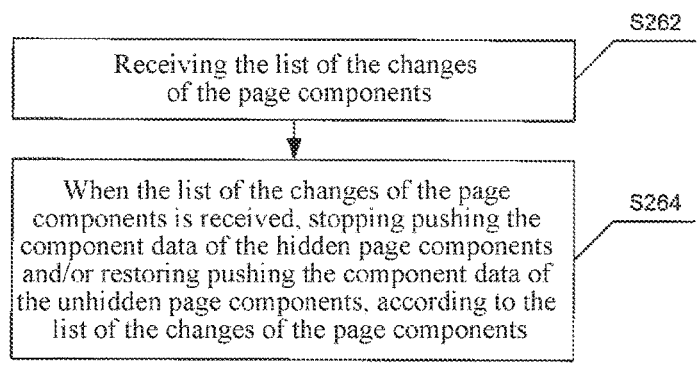
FIG. 9 is a flow chart illustrating yet another method for loading a webpage according to an exemplary embodiment.

FIG. 9 is a flow chart illustrating yet another method for loading a webpage according to an exemplary embodiment. The method 26 for loading a webpage illustrated in FIG. 9 is applicable in a web server. As illustrated in FIG. 9, the method 26 for loading a webpage includes the steps as follows.

In step S262, the list of the changes of the page components is received.

In step S264, when the list of the changes of the page components is received, the pushing of the component data of the hidden page components is stopped and/or the pushing of the component data of the unhidden page components is restored, according to the list of the changes of the page components.

In the case where the list of the changes of the page components includes only the newly added hidden page component at this time, the pushing of the component data of the newly added hidden page component is stopped. In the case where the list of the changes of the page components includes only the unhidden page component at this time, the pushing of the component data of the unhidden page component is restored. In the case where the list of the changes of the page components includes both the newly added hidden page component and the unhidden page component at this time, the pushing of the component data of the newly added hidden page component is stopped and the pushing of the component data of the unhidden page component is restored.

In some embodiment, after the WebSocket agent module 23 sends the received list of the changes of the page components to the data pushing management module 27, the data pushing management module 27 may store the hidden page component and/or the unhidden page component, thereby stopping pushing the component data of the hidden page component and/or restoring pushing the component data of the unhidden page component. Alternatively, the data pushing management module 27 may also send the list of the changes of the page components to the page component management module 25, the page component management module 25 stores the list of the changes of the page components and determines the hidden and/or unhidden page component according to the list of the changes of the page components. While it is required to push component data of the page component, the data pushing management module 27 inquires in the page component management module 25 whether said page component to send data is hidden, if it is hidden, component data thereof will not be pushed, and if it is unhidden, the pushing of the component data will be restored.

Figure 10:
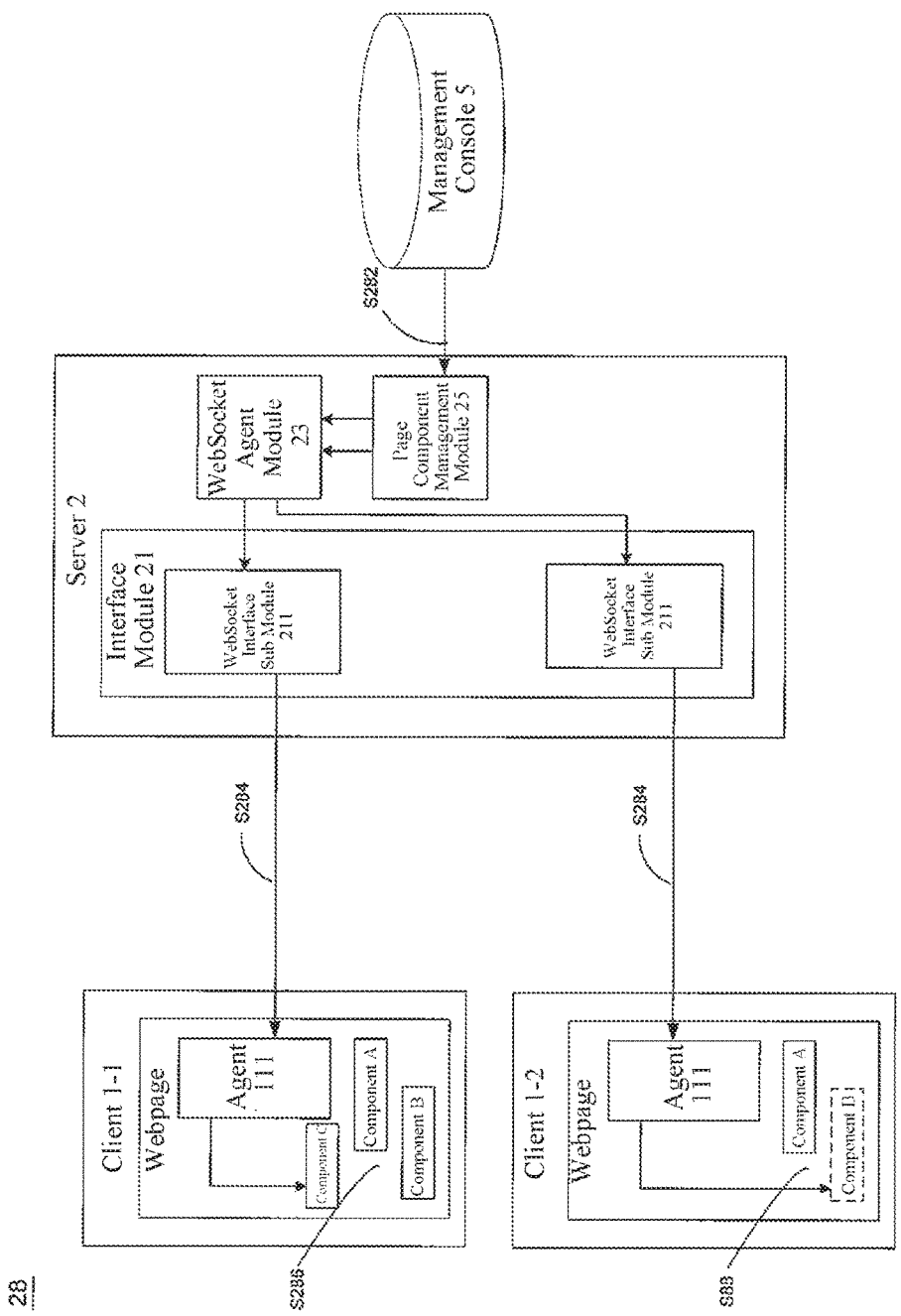
FIG. 10 is a schematic view illustrating a message interaction of yet another method for loading a webpage according to an exemplary embodiment.

FIG. 10 is a schematic view illustrating a message interaction of yet another method for loading a webpage according to an exemplary embodiment. As illustrated in FIG. 10, the method 28 for loading a webpage may include the steps as follows.

In step S282, the server 2 receives a page component adding message and/or a page component removing message from an external management console 5.

The administrator or the user with special authorizations may check all the page components for each client 1 stored in the server 2 using the management console 5, wherein the WebSocket connection with the page components have been established. The administrator or the user with special authorizations may instruct the server 2 using the management console 5 to control all or a part of the clients 1, to add the page component to or remove the page component from these clients 1. For example, a page component may be added to the client 1-1, and a page component may be removed from the client 1-2. Alternatively, the page component adding message and the page component removing message may be simultaneously sent to the same client.

The page component adding message may include a page component ID and properties of one or more page components to be added for one or some client 1. After receiving the message for adding the page component, for example, the server 2 may store the newly added page component and its properties in the page component management module 25 for the corresponding client 1.

The page component removing message may include a page component ID of one or more page components to be removed from one or some client 1. After receiving the page component removing message, for example, the server 2 may remove the one or more page components from the corresponding client 1. For example, the server 2 may update the record in the page component management module 25 and delete the one or more page components.

In step S284, the server 2 transfers the page component adding message and/or the page component removing message received from the management console 5 to the corresponding client 1.

For example, the server 2 sends the message for adding the page component to the client 1-1 and instructs the client 1-1 to add the page component C. In addition, the server 2 sends the page component removing message to the client 1-2 and instructs the client 1-2 to remove the page component B.

In some embodiment, the page component adding message and/or the page component removing message is received by the page component management module 25 of the server 2, and the messages are mapped to the corresponding WebSocket connection using the WebSocket agent module 23 and then are respectively sent to corresponding clients 1 (e.g., the client 1-1 and the client 1-2) through the WebSocket interface sub module 211.

In some embodiments, in the case where WebSocket connections are established between a plurality of clients 1 and the server 2, ports for the WebSocket connections may be multiplexed to save port resource for the WebSocket connection and avoid port limitations. Detailed schemes for multiplexing ports are well-known to those skilled in the art, which will be omitted herein.

In step S286, the client 1 may receive the page component adding message and/or the message for the removing the page component sent from the server 2.

For example, the client 1-1 receives the page component adding message sent from the server 2 and adds a page component C, and the client 1-2 receives the page component removing message sent from the server 2 and removes a page component B.

In step S288, the client 1 may add and/or remove page component according to the received page component adding message and/or the page component removing message.

For example, the client 1-1 may correspondingly add the page component indicated in the message according to the message for adding page component. For example, the page component may be added according to an index of the page component ID. The client 1-2 may correspondingly remove the page component indicated in the message according to the page component removing message.

The method 28 for loading a webpage provided in the embodiments of the present disclosure further provides a method for controlling webpages displayed for different clients by an external management console. For example, the external management console may be operated by an administrator or the user with special authorizations to add or remove page components for some clients. Accordingly, a layout and content of the webpage displayed in the clients may be different, thereby personalizing the page display.

Figure 11:
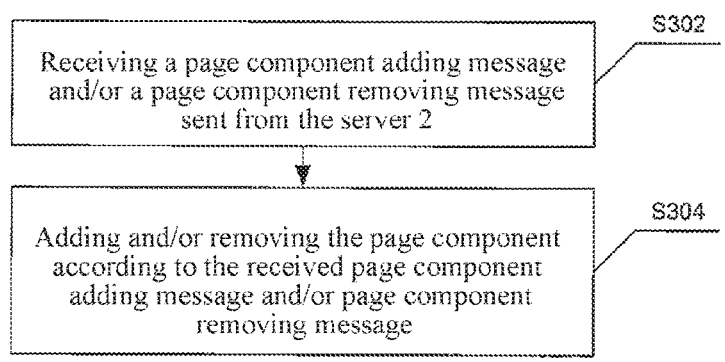
FIG. 11 is a flow chart illustrating yet another method for loading a webpage according to an exemplary embodiment.

FIG. 11 is a flow chart illustrating yet another method for loading a webpage according to an exemplary embodiment. The method 30 for loading a webpage is applicable in a web client. As illustrated in FIG. 11, the method 30 for loading a webpage may include the steps as follows.

In step S302, a page component adding message and/or a page component removing message sent from the server 2 is received.

For example, the client 1-1 receives the page component adding message sent from the server 2, and the client 1-2 receives the page component removing message sent from the server 2.

In step S304, the page component is added and/or removed according to the received message for adding and/or removing the page component.

For example, the client 1-1 may correspondingly add the page component indicated in the message according to the message for adding page component. For example, the page component may be added according to an index of the page component ID. The client 1-2 may correspondingly remove the page component indicated in the message according to the page component removing message.

Figure 12:
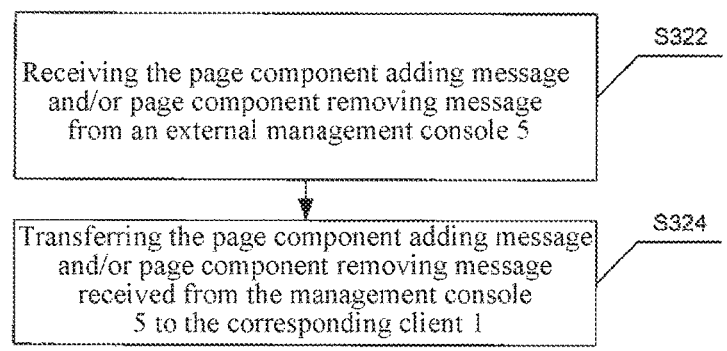
FIG. 12 is a flow chart illustrating yet another method for loading a webpage according to an exemplary embodiment.

FIG. 12 is a flow chart illustrating yet another method for loading a webpage according to an exemplary embodiment. The method 32 for loading a webpage illustrated in FIG. 12 is applicable in a web server. As illustrated in FIG. 12, the method 32 for loading a webpage may include the steps as follows.

In step S322, a page component adding message and/or a page component removing message is received from an external management console 5.

The administrator or the user with special authorizations may check all the page components for each client 1 stored in the server 2 using the management console 5, wherein the WebSocket connection with the page components have been established. The administrator or the user with special authorizations may instruct the server 2 using the management console 5 to control all or a part of the clients 1, to add the page component to or remove the page component from these clients 1. For example, a page component may be added to the client 1-1, and a page component may be removed from the client 1-2. Alternatively, the page component adding message and the page component removing message may be simultaneously sent to the same client.

The page component adding message may include a page component ID and properties of one or more page components to be added for one or some client 1. After receiving the page component adding message, for example, the server 2 may store the newly added page component and its properties in the page component management module 25 for the corresponding client 1.

The page component removing message may include a page component ID of one or more page components to be removed from one or some client 1. After receiving the page component removing message, for example, the server 2 may remove the one or more page components from the corresponding client 1. For example, the server 2 may update the record in the page component management module 25 and delete the one or more page components.

In step S324, the page component adding message and/or the page component removing message received from the management console 5 is transferred to the corresponding client 1.

For example, the server 2 sends the page component adding message to the client 1-1 and sends the page component removing message to the client 1-2.

In some embodiment, the page component adding message and/or the page component removing message is received by the page component management module 25 of the server 2, and the messages are mapped to the corresponding WebSocket connection using the WebSocket agent module 23 and then are respectively sent to corresponding clients 1 (e.g., the client 1-1 and the client 1-2) through the WebSocket interface sub module 211.

In some embodiments, in the case where WebSocket connections are established between a plurality of clients 1 and the server 2, ports for the WebSocket connections may be multiplexed to save port resource for the WebSocket connection and avoid port limitations. Detailed schemes for multiplexing ports are well-known to those skilled in the art, which will be omitted herein.

Figure 13:
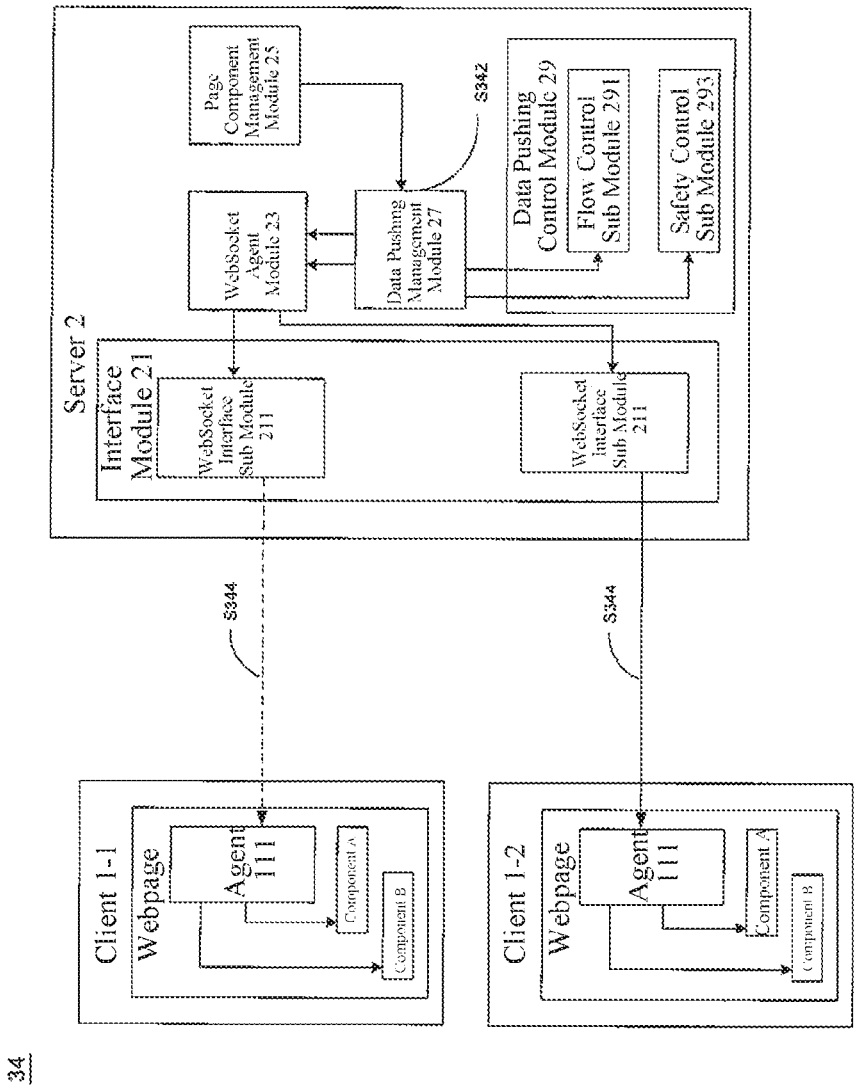
FIG. 13 is a schematic view illustrating a message interaction of yet another method for loading a webpage according to an exemplary embodiment.
Figure 14:
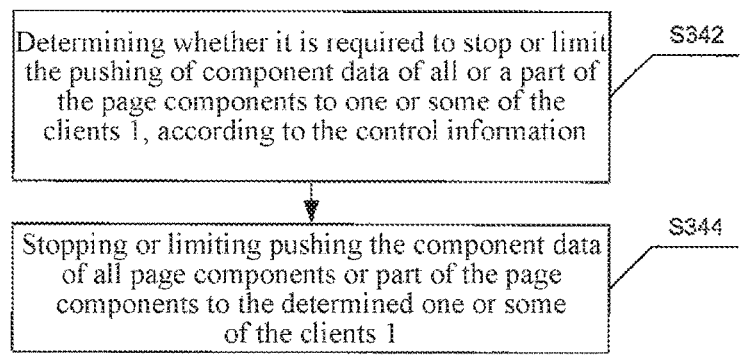
FIG. 14 is a flow chart of the method for loading a webpage illustrated in FIG. 13, which is applicable in a web server.

FIG. 13 is a schematic view illustrating a message interaction of yet another method for loading a webpage according to an exemplary embodiment. FIG. 14 is a flowchart illustrating the method 34 for loading a webpage illustrated in FIG. 13. The method 34 for loading a webpage is applicable in a web server. As illustrated in FIGS. 13 and 14, the method 34 for loading a webpage includes the steps as follows.

In step S342, it is determined if stopping or limiting pushing the component data of all page components or part of the page components to one or some of the clients 1, according to the control information.

In one embodiment, the step of limiting the pushing of component data includes limiting pushing speed of the component data.

In some embodiments, the server 2 includes a data pushing control module 29 that further includes a flow control sub module 291. The control information includes control information of high concurrent user access or massive data transmission that may be sensed by the flow control sub module 291 and obtained by the data pushing management module 27 from the flow control sub module 291, i.e., information regarding current total missions in the server 2. According to the control information, the data pushing management module 27 determines if stopping or limiting pushing the component data to one or some of the clients 1. For example, the data pushing management module 27 stops or limits the pushing of component data of all the page components to the client 1 (e.g., the client 1-1 illustrated in the drawings) having a massive data transmission currently. Alternatively, the data pushing management module 27 may stop or limit only the pushing of the component data of one or some of the page components of one or some of the clients 1 having a massive data transmission, thereby controlling the pushing of data based on a granularity of page component.

In some embodiments, the data pushing control module 29 further includes a safety control sub module 293, and the above control information further includes safety control information of a client having malicious act or malicious motive that is sensed by the safety control sub module 293 and obtained by the data pushing management module 27 from the safety control sub module 293. According to the safety control information, the data pushing management module 27 stops or limits the pushing of component data of the page components to the client 1 having malicious act or malicious motive.

In some embodiments, the above control information may further include a control message sent to the data pushing management module 27 from the page component management module 25. The control message includes changing of the page component of one or some of the clients 1, such that the data pushing management module 27 changes a pushing status of the component data for one or some of the clients 1.

In step S344, the pushing of the component data of all or a part of the page components to the determined one or some of the clients 1 is stopped or limited.

After determining if stopping or limiting pushing of component data of all page components or part of the page components to one or some of the clients 1, the server 2 stops or limits the pushing of component data of all or a part of the page components to the determined one or some of the clients 1. For example, as illustrated in FIG. 13, the pushing of component data to the client 1-1 is limited.

The method 34 for loading a webpage provided by the embodiments of the present disclosure further provides a method for controlling the pushing of data. The method may control the pushing of component data to the client according to current data sending condition, safety condition, and page component changing condition. The component data of all or a part of the page components for the client may be controlled, thereby realizing controlling the pushing of the component data based on a granularity of page component.

Those skilled in the art will appreciate that all or a part of the steps implementing the above embodiments may be embodied as a computer program executed by a CPU. When the computer program is executed by the CPU, the above functions according to the method of the disclosure may be performed. The program may be stored in a computer readable storage medium including for example a read only memory, a magnetic disk, an optical disk or the like.

In addition, it should be noted that the above drawings are provided for illustration of processes included in the method according to the exemplary implementations of the present disclosure, which are not provided for limitation. It should be appreciated that the processes illustrated in the drawings do not indicate or limit the timing order of the processes. Also, it should be appreciated that the processes may be performed asynchronously or synchronously in one or more modules.

Hereinafter, embodiments of devices of the present disclosure will be described, which may be configured to perform the method embodiments of the present disclosure. Details that are not described in the embodiments of devices may be referred to the method embodiments of the present disclosure.

Figure 15:
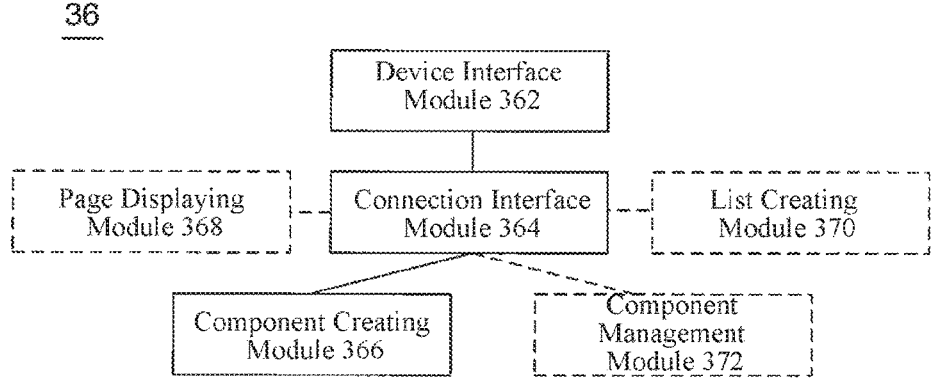
FIG. 15 is a block diagram illustrating a device for loading a webpage applicable in a client according to an exemplary embodiment.

FIG. 15 is a block diagram illustrating a device for loading a webpage applicable in a client according to an exemplary embodiment. As illustrated in FIG. 15, the device 36 for loading a webpage may include: a device interface module 362, a connection interface module 364 and a component creating module 366.

The device interface module 362 may be configured to: send a request message for a webpage to a server; receive an initial webpage of the webpage returned from the server, the initial webpage including an agent; and send a WebSocket connection request message to the server through the agent, to establish a WebSocket connection between the client and the server. The agent may include a front-end script.

The connection interface module 364 may be configured to: send a page component request message of the webpage to the server based on the WebSocket connection, to load page components of the webpage; and receive the page components of the webpage returned from the server based on the WebSocket connection.

The component creating module 366 is configured to create the page components at corresponding positions in the initial webpage.

In some embodiments, the connection interface module 364 may be further configured to receive the component data of the page components of the webpage pushed from the server based on the WebSocket connection. The device 36 for loading a webpage may further include: a page displaying module 368 configured to parse the component data of the page components of the webpage, update the page components of the webpage and display the webpage.

In some embodiment, the connection interface module 364 receives the component data of the page components of the webpage pushed from the server periodically. When the webpage includes a plurality of page components, pushing period of the component data of each of the page components may be the same or different.

In some embodiment, the device 36 for loading a webpage may further include a list creating module 370 configured to obtain hiding information of the page components of the webpage through the agent and form a list of the changes of the page components of the webpage. The connection interface module 364 may be further configured to send the list of the changes of the page components of the webpage to the server based on the WebSocket connection. In one embodiment, the hiding information of the page components of the webpage may be obtained by detecting user operations. The list of the changes of the page components of the webpage may include at least one of: each page component that is hidden at this time, each page component that is unhidden at this time, all the currently hidden page components, and all the page components that are not hidden currently.

In some embodiments, the connection interface module 364 may be further configured to receive a page component adding message and/or a page component removing message of the webpage sent from the server based on the WebSocket connection. The device 36 for loading a webpage may further include a component management module 372 configured to add or remove corresponding page component in the webpage according to the page component adding message to and/or the page component removing message from the webpage.

Figure 16:
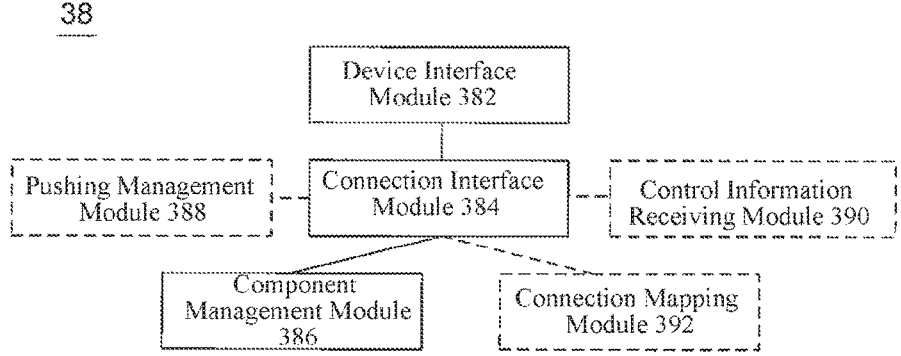
FIG. 16 is a block diagram illustrating a device for loading a webpage applicable in a server according to an exemplary embodiment.

FIG. 16 is a block diagram illustrating a device for loading a webpage applicable in a server according to an exemplary embodiment. As illustrated in FIG. 16, the device 38 for loading a webpage includes a device interface module 382, a connection interface module 384 and a component management module 386.

The device interface module 382 is configured to: receive a webpage request message sent from a client; send an initial webpage of the webpage to the client, the initial webpage including an agent; and receive a WebSocket connection request message sent from the client, to establish a WebSocket connection with the client.

The connection interface module 384 is configured to receive a page component request message of the webpage sent from the client based on the WebSocket connection.

The component management module 386 is configured to obtain the page component of the webpage of the client.

The connection interface module 384 is further configured to send the page component of the webpage to the client based on the WebSocket connection.

In some embodiments, the component management module 386 is further configured to obtain the page component of the webpage of the client from a page component storage.

In some embodiments, the device 38 for loading a webpage may further include a pushing management module 388 configured to read properties of the page component of the webpage of the client from the component management module, and obtain the component data of the page component of the webpage of the client according to the properties. The connection interface module 384 is further configured to push the component data of the page component of the webpage to the client based on the WebSocket connection.

In some embodiment, the pushing management module 388 is further configured to obtain the component data of the page component of the webpage of the client from a component data storage.

In some embodiment, the pushing management module 388 is further configured to obtain the component data of the page component of the webpage of the client periodically according to a pushing period of the component data among the properties. When the webpage includes a plurality of page components, the pushing period of the component data of each of the page component may be the same or different.

In some embodiments, the connection interface module 384 may be further configured to receive a list of the changes of the page components of the webpage of the client based on the WebSocket connection. The pushing management module 388 may be further configured to stop the pushing of the component data of the hidden page component of the webpage of the client and/or restore the pushing of the component data of the unhidden page component of the webpage of the client according to the list of the changes of the page components.

In some embodiments, the component management module 386 may be further configured to update the stored information of the page component of the webpage of the client according to the list of the changes of the page components of the webpage. The list of the changes of the page components of the webpage includes at least one of: each page component that is hidden at this time, each page component that is unhidden at this time, all the currently hidden page components, and all the page components that are not hidden currently.

In some embodiments, the device 38 for loading a webpage may further include a control information receiving module 390 configured to receive a page component adding message to or removing the page component from the webpage of the client from a management console 5. The connection interface module 384 may be further configured to send the page component adding message to or removing the page component from the webpage to the client according to the WebSocket connection.

In some embodiment, the component management module 386 may be further configured to update the stored information of the page component of the webpage of the client according to the page component adding message to or removing the page component from the webpage.

In some embodiment, the pushing management module 388 is further configured to determine if stopping or limiting pushing the component data of all page components or part of the page components of the webpage of the client according to control information. The control information may include at least one of information regarding current total missions, information regarding safety control, and information regarding changes of the page components.

In some embodiments, the device 38 for loading a webpage may further include a connection mapping module 392 configured to map the WebSocket connection with the webpage of the client. For example, after the server receives a message from the WebSocket connection through the connection interface module 384, the connection mapping module 392 is required to map the WebSocket connection with a webpage of a client, such that other modules may proceed to the related operations on the webpage of the client.

It should be noted that the blocks illustrated in the drawings are functional entities, which do not necessarily correspond to physical or logical independent entities. The above functional entities may be implemented in the form of software, or in one or more hardware modules or integrated circuits, or in different networks and/or processing devices and/or microcontroller devices.

Further, the present disclosure further discloses a system for loading a webpage including the above device 36 for loading a webpage applicable in the client and the above device 38 for loading a webpage applicable in the server.

Figure 17:
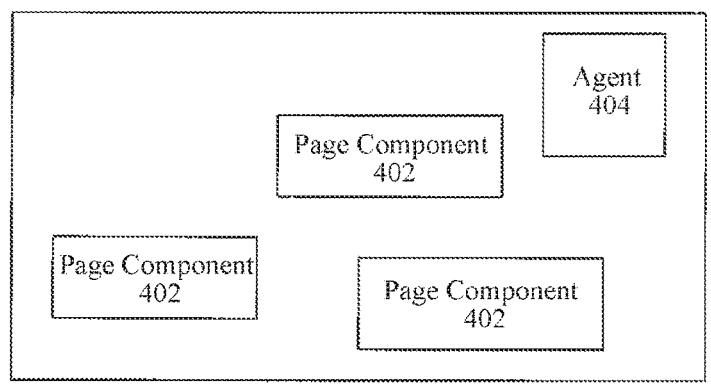
FIG. 17 is a block diagram illustrating an output display system of a client according to an exemplary embodiment.

FIG. 17 is a block diagram illustrating an output display system of a client according to an exemplary embodiment.

As illustrated in FIG. 17, the output display system 40 of the client includes a page component 402 and an agent 404.

The page component 402 may be arranged according to a page layout. The page component 402 may include one or more page components.

The agent 404 is configured to establish a WebSocket connection with transmit the page component and component data of the page component.

According to the descriptions on the above implementations, those skilled in the art will easily appreciate that the example implementations may be implemented in the form of a software, or in a combination of a software and a necessary hardware. Accordingly, technical solutions of the implementations according to the present disclosure may be carried out in the form of software productions that may be stored in a non-volatile memory media (e.g., a CD-ROM, a flash disk, a portable hard drive or the like) or in a network. The software productions may include instructions that cause a computer device (e.g., a personal computer, a server, a mobile terminal, a network device or the like) to perform the methods according to the implementations of the present disclosure.

Hereinabove, exemplary embodiments of the present disclosure have been illustrated and described in detail. It should be appreciated that the present disclosure is not limited to the detailed structures, arrangements or implementations described herein. Rather, the present disclosure intends to cover various modifications and equivalent arrangements included in the spirit and scope of the claims.

What is claimed is:

1. A method for loading a webpage in a client, which communicates with a Web server through a communication network, wherein the Web server includes an interface module, a WebSocket agent module and a page component management module, the method executable by an electronic device at the client side, the method comprising:
sending a webpage request message from the client to the interface module of the Web server via a first connection;
receiving, at the client, an initial webpage of the webpage returned from the interface module of the Web server, the initial webpage comprising an agent;
sending a WebSocket connection request message from the client to the Web server through the agent, to establish a second connection with the Web server, the second connection being a WebSocket connection;
sending a page component request message of the webpage from the client to the interface module of the Web server based on the WebSocket connection, wherein the WebSocket agent module maps the WebSocket connection with the requested webpage and determines a webpage corresponding to the page component request, and the page component management module obtains corresponding page components of the webpage from a page component storage memory according to the determined webpage;
receiving, at the client, the page component of the webpage returned from the interface module of the Web server based on the WebSocket connection; and
creating, at the client, the page component at corresponding positions in the initial webpage to finish loading the webpage, whereby loading the webpage via the first connection and the WebSocket connection, without requesting updating page data by polling;
obtaining hiding information of the page component of the webpage through the agent, and forming a list of changes of the page component of the webpage; and sending the list of the changes of the page component of the webpage to the server based on the WebSocket connection; the hiding information of the page component of the webpage is obtained by detecting a user operation.

2. The method according to claim 1, further comprising:
receiving component data of the page component of the webpage pushed from the Web server based on the WebSocket connection; and
parsing the component data of the page component of the webpage and updating the page component of the webpage, to display the webpage.

3. The method according to claim 2, wherein the step of receiving component data of the page component of the webpage pushed from the Web server based on the WebSocket connection comprises:
receiving the component data of the page component of the webpage pushed from the Web server periodically based on the WebSocket connection,
wherein when the webpage comprises a plurality of page components, pushing periods of the component data of each of the page components are the same or different.

4. The method according to claim 1, wherein the list of changes of the page component of the webpage comprises at least one of: each page component that is hidden at this time, each page component that is unhidden at this time, all the currently hidden page components, or all the page components that are not hidden currently.

5. The method according to claim 1, further comprising:
receiving at least one of a page component adding message or a page component removing message sent from the Web server based on the WebSocket connection; and
adding or removing corresponding page component from the webpage according to at least one of the received page component adding message or the page component removing message of the webpage.

6. The method according to claim 1, wherein the agent comprises a front-end script.

7. A method for loading a webpage in a Web client, which communicates with a Web server through a communication network, wherein the Web server includes an interface module, a WebSocket agent module and a page component management module, the method executable by an electronic device at the Web server side, the method comprising:
receiving, at the interface module of the server, a webpage request message sent from the Web client via a first connection;
sending an initial webpage of the webpage from the interface module of the server to the Web client, the initial webpage comprising an agent;
receiving, at the interface module of the server, a WebSocket connection request message sent by the agent of the Web client, to establish a second connection with the Web client, the second connection being a WebSocket connection;
receiving, at the interface module of the server, a page component request message of the webpage sent from the Web client based on the WebSocket connection, wherein the WebSocket agent module maps the WebSocket connection with the requested webpage and determines a webpage corresponding to the page component request, and the page component management module obtains corresponding page components of the webpage from a page component storage memory according to the determined webpage;
obtaining, at the server, a page component of the webpage of the Web client; and
sending the page component of the webpage from the interface module of the server to the Web client based on the WebSocket connection to finish loading the web page, whereby loading the webpage via the first connection and the WebSocket connection, without requesting updating page data by polling;
receiving a list of changes of the page component of the webpage of the Web client based on the WebSocket connection; and
performing at least one of stopping pushing the component data of a hidden page component or restoring pushing the component data of a unhidden page component of the webpage of the Web client according to the list of the changes of the page component; updating stored information of the page component of the webpage of the Web client according to the list of the changes of the page component.

8. The method according to claim 7, wherein the step of obtaining a page component of the webpage of the Web client comprises: obtaining the page component of the webpage of the Web client from a page component storage.

9. The method according to claim 7, further comprising:
reading properties of the page component of the webpage of the Web client;
obtaining component data of the page component of the webpage of the Web client according to the properties; and
pushing the component data of the page component of the webpage to the Web client based on the WebSocket connection.

10. The method according to claim 9, wherein the step of obtaining component data of the page component of the webpage of the Web client comprises: obtaining the component data of the page component of the webpage of the Web client from a component data storage.

11. The method according to claim 9, wherein the step of obtaining component data of the page component of the webpage of the Web client according to the properties comprises: obtaining the component data of the page component of the webpage of the Web client periodically according to a pushing period of the component data among the properties, wherein when the webpage comprises a plurality of page components, the pushing periods of the component data of each of the page components are the same or different.

12. The method according to claim 7, wherein the list of the changes of the page component of the webpage comprises at least one of: each page component that is hidden at this time, each page component that is unhidden at this time, all the currently hidden page components, or all the page components that are not hidden currently.

13. The method according to claim 7, further comprising:
receiving, from a management console, at least one of page component adding message or page component removing message from the webpage of the Web client; and
sending at least one of the page component adding message or the page component removing message to the Web client based on the WebSocket connection.

14. The method according to claim 13, further comprising:
updating stored information of the page component of the webpage of the Web client according to at least one of the page component adding message or the page component removing message from the webpage.

15. The method according to claim 9, further comprising:
determining if stopping or limiting pushing the component data of all page components or part of the page components of the webpage of the Web client according to control information.

16. The method according to claim 15, wherein the control information comprises at least one of information regarding current total missions, information regarding safety control, or information regarding changes of the page component.

17. A device for loading a webpage applicable in a Web client, which communicates with a Web server through a communication network, wherein the Web server includes an interface module, a WebSocket agent module and a page component management module, the method executable by an electronic device at the client side, the device comprising a processing device which is configured to:

send a webpage request message to the interface module of the Web server via a first connection;

receive an initial webpage of the webpage returned from the interface module of the Web server, the initial webpage comprising an agent; and send a WebSocket connection request message to the Web server through the agent, to establish a second connection with the server, the second connection being a WebSocket connection;

send a page component request message of the webpage to the interface module of the Web server based on the WebSocket connection, wherein the WebSocket agent module maps the WebSocket connection with the requested webpage and determines a webpage corresponding to the page component request, and the page component management module obtains corresponding page components of the webpage from a page component storage memory according to the determined webpage; and receive the page component of the webpage returned from the interface module of the Web server based on the WebSocket connection; and create the page component at corresponding positions in the initial webpage to finish loading the webpage, whereby loading the webpage via the first connection and the WebSocket connection, without requesting updating page data by polling; obtaining hiding information of the page component of the webpage through the agent, and forming a list of changes of the page component of the webpage; and sending the list of the changes of the page component of the webpage to the server based on the WebSocket connection; the hiding information of the page component of the webpage is obtained by detecting a user operation.

* * * * *